Jan. 10, 1956 L. C. JOHNSON 2,730,240
DEHYDRATION OF OILS
Filed Feb. 8, 1952
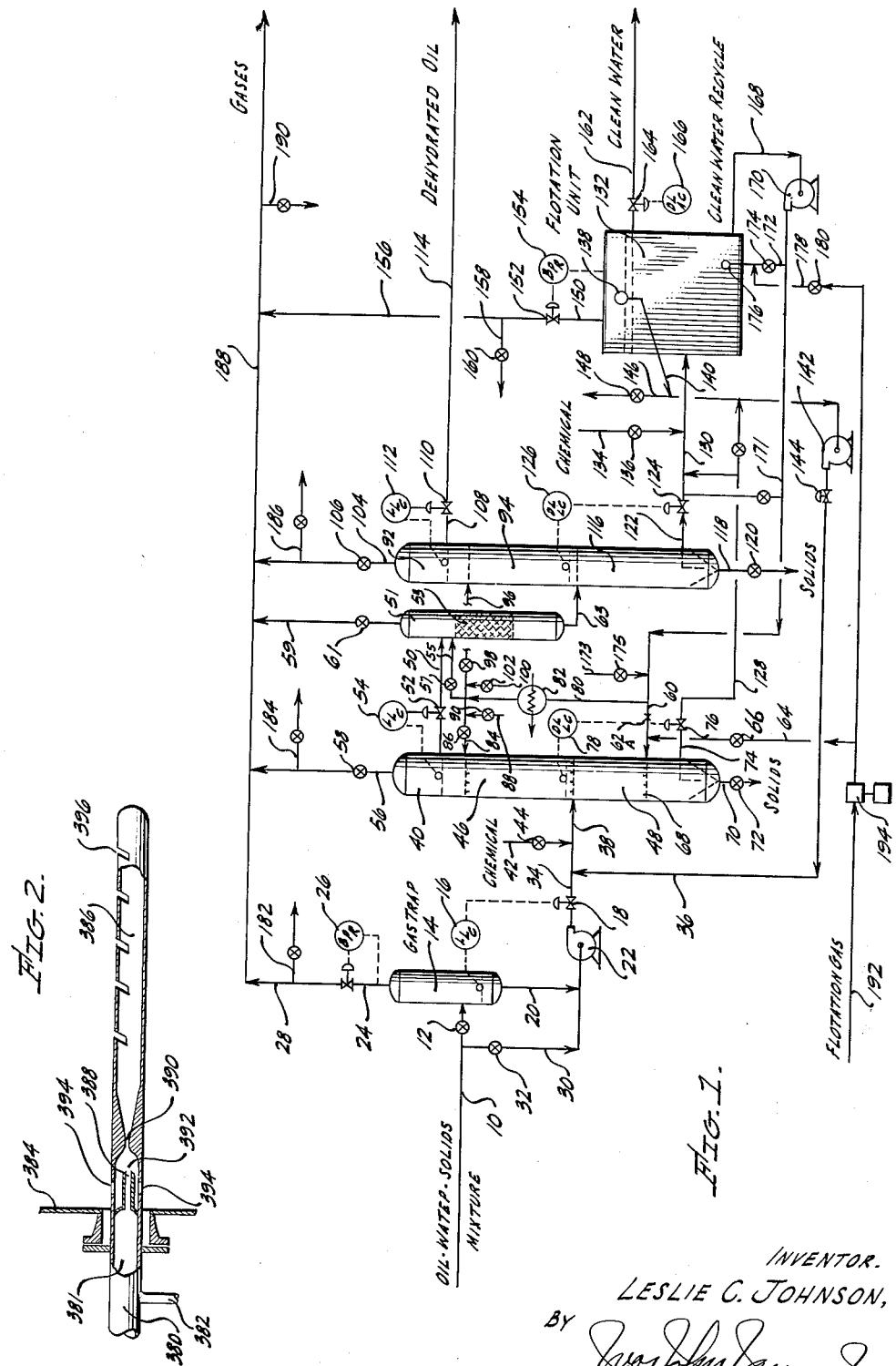
INVENTOR.
LESLIE C. JOHNSON,
BY
AGENT.

United States Patent Office 2,730,240
Patented Jan. 10, 1956

2,730,240

DEHYDRATION OF OILS

Leslie C. Johnson, Redondo Beach, Calif., assignor to Union Oil Company of California, Los Angeles, Calif., a corporation of California Application February 8, 1952, Serial No. 270,725

17 Claims. (Cl. 210—53)

This invention relates to the purification of contaminated oils and particularly relates to the removal of water from such oils. Specifically the invention is drawn to a combination method for the treatment of oil-water mixtures in which a flotation procedure is employed to separate oil from the water phase and a hot water wash is employed to remove water contaminating the oil phase.

Oil contaminated with water is encountered in many industrial operations. The crude petroleum produced from oil wells is nearly always contaminated with substantial quantities of water usually containing salt. This petroleum is also sometimes contaminated with solid hydrocarbonaceous materials. Water contaminated oils are produced in the refining of petroleum fractions wherein such well-known processes as caustic or acid washing or other chemical treatments are effected. The refinery drainage accumulated comprises oil heavily contaminated with water and occurs in varying quantities in drainage from various petroleum refining equipment. Oils contaminated with water are also produced in the production and refining of coal tar fractions, the retorting of oils from oil shales, the recovery of fish oils from various marine animals, as well as in the steam distillation of vegetable oils and fats. Many other miscellaneous operations exist in which oils are produced or treated or otherwise handled in the presence of steam or water leading to the production of an oil containing water as contamination, either as a dispersion, emulsion or a mere mechanical mixture.

Customarily, oil dehydration is accomplished by heating, stripping, the adsorption of the water from the oil by the use of solid granular adsorbents, treatment of the contaminated oil with chemicals, to produce hydrous chemicals and the like. Such processes are sufficiently satisfactory when dealing with small amounts of materials. But on a large scale where hundreds or thousands of barrels of such contaminated oils are involved, these operations become expensive, mechanically complex, and require large quantities of electricity and heat. Distillation especially requires great quantities of heat and the same disadvantage is present in those procedures in which the entire stream of contaminated oil and water is heated, especially in those cases where the oil content of the total stream is low.

It is herefore a primary object of this invention to provide a process and apparatus adapted to the dehydration of water-contaminated oils in large quantities and at high rates.

An additional object is to provide an improved process and apparatus for the dehydration of water-contaminated oils and the recovery of substantially all the oil.

It is a specific object of this invention to provide an improved process for oil dehydration and recovery which involves simultaneous countercurrent water washing of the supernatant oil fraction and countercurrent gas flotation of the subnatant water fraction including the wash water.

Another object of the present invention is to provide an improved device for the injection and dispersion of the flotation gases into the treating apparatus.

Other objects of this invention and the advantages thereof will become apparent to those skilled in the art as the description thereof proceeds.

The present invention briefly comprises an improved process for treating oil and water mixtures which may or may not contain contaminating solids, which process involves the step of countercurrently washing a supernatant oil phase with a heated stream of water and simultaneously subjecting the water phase including that stream of water employed for washing the oil to a countercurrent flotation gas procedure which serves to recover residual quantities of oil from the water. This operation is effected in appropriate equipment such as a contacting column to produce simultaneously a dehydrated oil and a water product which is substantially free from oil contamination. In other modifications of the present invention, a plurality of such contacting columns is employed with the raw contaminated oil mixture being introduced into the first column and the oil produced therefrom successively flowing through the one or more subsequent columns. In each column the oil is subjected to a countercurrent hot water phase and in at least the first column the water phase is subjected simultaneously to the countercurrent treatment with a flotation gas injected in a particular manner. The heat requirements are materially reduced since only the oil phase is heated by means of the countercurrent hot water wash rather than heating the entire oil and water stream.

It has been found that the conventional methods of injecting flotation gases into the flotation zones of the present invention are not adequate to treat water-contaminated oil and that these injection methods are very ineffective where the oil is present in the water as an emulsion or dispersion. It has been found that by a procedure hereinafter described in detail flotation gas bubbles dispersed in a stream of water and ranging in size from those which are microscopic to those which are barely visible may be produced. The process thus produces water-free oil and substantially oil-free water simultaneously.

A flotation gas under pressure is injected into and at least partially dissolved in a clean water recycle stream flowing into the individual flotation cells through the jet flotation device. Microscopic flotation gas bubbles are subsequently formed from the dissolved gas upon the release of the pressure and effectively agglomerate the minute oil particles while the larger dispersed bubbles sweep these particles to the surface.

In any of the flotation steps of the process of this invention, the flotation gas bubbles fall into two classifications according to size. By injecting flotation gas into the water recycle stream, part of the gas is dissolved. Subsequent depressuring of the thus gas-treated water recycle through the jet dispersion device causes liberation of most of the dissolved flotation gas in the form of extremely minute microscopic gas bubbles. These bubbles are believed to be about the same size as the emulsified oil particles and effectively agglomerate them. The undissolved part of the flotation gas is dispersed into larger bubbles by the jet dispersion device and these larger bubbles effectively sweep the small bubble-oil particle agglomerates upwardly through the water phase into the supernatant oil phase. The microscopic bubbles are apparently of the order of from $10^{-4}$ to $10^{-2}$ mm. in diameter while the diameter of the larger dispersed bubbles are of the order of 0.5 to 5 mm. Bubbles of these sizes are believed to be the ones effective to secure the results. Only through the partial dissolution of flotation gas in a recycle water stream and subsequent depressuring and dispersion can these size ranges of bubbles and the efficient results be obtained.

This procedure has been found extremely effective in reducing oil contamination of the water stream produced from the oil washing step to unexpectedly low values such as of the order of less than 10 parts per million from values which may range as high as 500 parts per million in the original water phase.

The agglomerated oil is wet and accumulates in the supernatant oil body wherein it is dehydrated by a countercurrent contact with a flow of heated water forming at least partially dehydrated oil. This oil may be subjected, if desired, to additional hot water washes to form a substantially dry oil.

In another modification, the present oil washing and gas flotation system is improved by providing for further flotation treatment of the water product in a separate supplemental flotation cell to effect complete oil recovery. The small amounts of recovered oil are returned to the oil washing step for dehydration and the major part of the oil-free water product is disposed of or sent to storage or reused while a minor part of the product is returned to supply the recycle water streams required in the flotation steps as well as the heated water stream required in the hot water washing steps.

The present invention will be more clearly understood by reference to the accompanying drawings in which:

Figure 1 is a schematic flow diagram showing the countercurrent oil washing and flotation process of the present invention showing also the modification in which a supplementary separate flotation treatment is given the product water, and Figure 2 is a detailed view in cross section of jet injection and dispersion unit employed in the flotation portion of the operation.

The discussion of the processes of this invention is hereinafter conducted as though the oil-water mixture was an oil field brine, that is, the water produced in variable quantities simultaneously with crude petroleum and containing emulsified or dispersed petroleum as a contaminant, variable quantities of natural gas as well as finely divided solids. It is to be understood, however, that this choice is by way of illustration only and that other oil-water mixtures including those named above may be similarly treated for the porduction of a substantially dry oil product and a substantially clean oil-free water product stream as shown in the specific examples.

Referring now more particularly to Figure 1, the total production of crude petroleum, gas, and water from one or a plurality of producing oil wells and which may or may not contain dispersed solids is passed through line 10 at a rate controlled by valve 12 into gas trap 14. This trap permits the removal of natural gas from the liquids and solids portion of the mixture. A liquid level is maintained in the lower portion of trap 14 by means of liquid level controller 16 which serves to actuate control valve 18 and vary the flow rate liquid removed through line 20 and pump 22. The liberated gases are removed via line 24 at a variable rate determined by back pressure regulator 26 and are sent to production through line 28.

In some instances, the source of the oil-water mixture is at a sufficiently high pressure that liquid flow through the entire process without the use of pump 22 is permitted.

In other cases, the gas content of the material to be treated is low, and in the case of other oil and water mixtures other than crude petroleum production, the gas content is substantially zero. In such instances, the liquid mixture to be treated is passed directly through line 10 through line 30 at a rate controlled by valve 32 into the subsequent treatments described below.

The liquid mixture of oil and water is passed through line 34 and combined with wet recycle oil from the flotation unit flowing through line 36. This material passes through line 38 into primary flotation and oil washing column 40 at an intermediate point. Chemical reagents to assist in the stratification and flotation separation may be added, if required, by means of line 42 at a rate controlled by valve 44.

A partial separation of oil and water phases is effected in column 40 and a supernatant body of oil 46 is maintained in column 40 above the intermediate point at which the mixture is introduced. In the bottom portion of the column is maintained primary flotation zone 48. The liberated oil rises into the supernatant body 46 from which a stream is removed from a point adjacent the top of the column through line 50 at a rate controlled by valve 52 in accordance with liquid level controller 54. In simplified modifications this controller may comprise a weir. Gas is removed from column 40 via line 56 by valve 58 which may comprise a back pressure regulator. The thus removed gas may be combined with or kept separate from gas removed from gas trap 14 as described. Since the gas removed from column 40 comprises essentially the flotation gas injected to primary flotation zone 48 described below and since the flotation gas may or may not be the same as the gas produced from the gas trap, these gases under such conditions are not combined but are recirculated through the primary and secondary flotation systems.

In flotation zone 48 the separated water phase passes downwardly toward the bottom of the column countercurrent to a stream of flotation bubbles generated by means of an injector unit more clearly shown in Figure 2 and described below. A stream of clean water recycle, into which a flotation gas under pressure has been injected, is introduced into the bottom of primary flotation zone 48. Recycled clean water, preferably produced from the secondary flotation zone but which may be removed from the bottom of column 40, is introduced through line 60 at a rate controlled by valve 62 and is combined with a variable stream of flotation gas under pressure flowing through line 64 at a rate controlled by valve 66. The recycled water therefore contains dissolved flotation gas in an amount dependent upon the solubility of the gas and the pressure of injection. This stream is introduced into the bottom of primary flotation zone 48 by means of a jet injector and dispersion unit 68 more clearly shown in Figure 2. Great quantities of flotation gas bubbles are formed as described above and pass upwardly countercurrent to the downward flow of contaminated water. Oil and water emulsions are thus broken and the liberated agglomerated oil particles are carried upwardly into the upper oil washing zone 46.

As above described, this gas is ultimately removed from the top of column 40. Solid materials separated from the liquid system accumulate in the bottom of column 40 and are withdrawn therefrom through line 70 intermittently or at a rate controlled by valve 72. The partially purified water, which includes that which is separated from the liquid feed to the column and the warm water injected into water washing zone 40 at the top of the column, is removed at a point below the injection and dispersion inlet 68 through line 74 at a rate controlled by valve 76. This valve is continuously actuated by differential liquid level controller 78 which maintains the oil-water interface adjacent the liquid feed inlet to column 40 and preferably above this inlet.

Part of the clean water produced in the secondary flotation system is passed from line 60 through line 80 through heater 82 and is subsequently passed through line 84 at a rate controlled by valve 86 into oil washing zone 46. The warm water is dispersed and passes countercurrent to the oil. If desired, chemicals may be introduced into this warm water stream by means of line 88 at a rate controlled by valve 90 to assist in the oil washing step. A rapid heat transfer between the entering warm water and the rising oil occurs in washing zone 46, thus concentrating the heat in the oil washing system only where it is effective. The requirement in conventional systems of heating the entire oil-water stream is hereby eliminated.

The oil leaving column 40 is warm and the water passing into primary flotation zone 48 from oil washing zone 46 is cool.

When further dehydration is desired the partially washed oil passing via line 50 from column 40 is introduced into degassing zone or column 51. The oil passes downwardly through the column through packing 53 concurrently with a stream of the heated water recycle introduced through line 55 at a rate controlled by valve 57. A rapid evolution of any gas remaining in the oil takes place which is removed from the column through line 59 controlled by valve 61. The degassing column is required in cases when the flotation gas, is readily soluble in the oil phase as is the case with natural gas and petroleum oils. In other cases, such as nitrogen and vegetable oils and the like where gas solubility is low, the degassing column may be eliminated. The degassed and partially dehydrated oil then passes from the bottom of degassing zone 51 through line 63 and enters the secondary oil washing column 92 at an intermediate point.

Herein the upwardly flowing oil passes through secondary oil washing zone 94 countercurrent to downwardly flowing dispersed warm water introduced from heater 82 through line 96 at a rate controlled by valve 98. Chemical reagents, if desired, may be introduced through line 100 controlled by valve 102 into this warm water stream. Accumulations of gases which may be liberated in column 92 are removed therefrom through line 104 at a rate controlled by valve 106 which may be a back pressure regulator. These gases may be combined with those removed from the top of column 40. Warm dehydrated oil is removed from a point adjacent the top of column 92 through line 108 at a rate controlled by valve 110 which in turn is actuated by liquid level controller 112. The liquid level is thus maintained in the column by means of the system shown or by means of a simple weir. The dehydrated oil product passes via line 114 to additional washing steps if required or to further processing or storage facilities not shown.

In the bottom of column 92 is settling zone 116 from the bottom of which granular solids which may accumulate are removed through line 118 intermittently or at a rate controlled by valve 120. The further clarified water is removed from the bottom of settling zone 116 through line 122 at a rate controlled by valve 124 in accordance with differential liquid level controller 126, thus maintaining the oil-water interface at a point adjacent the partially dehydrated oil inlet of column 92. If desired, or in the case where additional washing steps are employed, flotation may be used in the bottom of column 92 also.

The partially clarified water removed as described from column 40 passes via line 128 and is combined with the partially purified water removed through line 122 from column 92. In some instances, this water is sufficiently clean for certain uses and may be employed or discarded in the form in which it is withdrawn from the bottom of the two columns described. Thus, it may pass to production or disposal or further uses through line 130. In such a case, a portion of the water thus produced is recirculated to the bottom of primary flotation zone 48 for use in the jet injection and dispersion unit 68.

The combined streams of water from columns 40 and 92 may be subsequently treated in secondary flotation unit 132. If desirable, flotation chemicals may be injected by means of line 134 at a rate controlled by valve 136 into the inlet water stream. In secondary flotation zone 132 the partially purified water is again countercurrently contacted by a stream of flotation bubbles generated as described above, whereby the residual oil contamination, usually in the form of very tight emulsions, suspensions or dispersions, is freed from the water and accumulates as a supernatant layer of oil. The thus separated oil is wet and is removed through overflow 138 and then passes by means of line 140 and pump 142 at a rate controlled by valve 144 for combination with the feed to tower 40 through line 36 as previously described. If desired, all or a portion of the thus recovered oil may be produced from the secondary flotation unit through line 146 at a rate controlled by valve 148.

The flotation gas accumulating in the top of the flotation unit is removed therefrom through line 150 at a rate controlled by valve 152 as actuated by back pressure regulator 154. This gas may be passed through line 156 for combination with the other gases produced, as described above, or it may be removed through line 158 controlled by valve 160 and repressured for recirculation through secondary flotation zone 132.

The clean water produced is removed from flotation unit 132 through line 162 at a rate controlled by valve 164 and actuated by differential liquid level controller 166. This level control system may comprise a gooseneck take off for the lower water layer, if desired.

A portion of the clean water is removed from flotation unit 132 through line 168 and is pressured by pump 170. A part of this stream is passed via line 171 for reintroduction into the bottom of primary flotation zone 48. If desired, flotation accelerating chemicals may be introduced into this stream through line 173 controlled by valve 175. The remaining portion of this clean water recycle is passed through line 172 at a rate controlled by valve 174 and is combined with flotation gas under pressure for passage into the jet injection and dispersion unit 176. The flotation gas under pressure is introduced into the recycle water in line 172 by means of line 178 at a rate controlled by valve 180. This flotation gas may be secured from any of the gas streams or a combination thereof produced from vessels 14, 40, 92 or 132. Thus, this gas may therefore be removed from line 28 through line 182, from line 56 through line 184, from line 104 through line 186, or from line 150 through line 158 in the event that these streams are not combined. In the case where the total gas production is combined, a portion of the combined gas stream flowing through line 188 may be removed therefrom through line 190 for use as the flotation gas.

In any event, the flotation gas in passed via line 192 through compressor 194 and the compressed flotation gas is subsequently divided into two or more streams for use in the process. In the drawing and as described, this pressured flotation gas passes through line 64 into the bottom of primary flotation zone 48 and through line 178 into secondary floation zone 132.

Referring now particularly to Figure 2, a detailed drawing in cross section of the preferred type of injection and dispersion unit employed as above described in the various flotation zones is shown. This device is provided with recycle water inlet 380 into which opens flotation gas inlet 382. Tube 380 is flange coupled to wall 384 of a flotation unit and extends through the flange terminating in a perforated hollow distributor portion 386 which may be a linear or circular tube. The mixture of recycled water and injected flotation gas under pressure passes from mixing chamber 381 through restriction or jet or nozzle 388 which is coaxially aligned with the throat of Venturi 390. Jet 388 is surrounded by inspiration zone 392 which communicates with the interior of the vessel 384 via inspiration ports 394.

The high pressure mixture of water and flotation gas is depressured through and ejected from jet 388 through a restriction in the form of Venturi 390 into distribution zone 386. A low pressure is thus established in inspiration zone 392 thereby drawing liquid through inspiration apertures 394 from the interior of vessel 384 for redistribution through distribution zone 386. Upon passage of the mixture of the water and gas through the restriction into zone 386, the resulting pressure drop causes the liberation of dissolved flotation gas from the water recycle. This gas, as discussed above, takes the form of extremely minute bubbles of gas which are delivered from zone 386 via distribution slots 396. The Venturi restriction is much preferred, but other types of restriction can be used with less aspiration effect.

Although other distributing means such as canvas socks, porous barriers of various types, and the like, may be employed to generate flotation bubbles, the preferred means is the one shown in Figure 2. The bringing together of recycled flotation water and flotation gas under pressure sufficient to dissolve at least a portion of the flotation gas in the water and the subsequent depressuring of the water has been found to be considerably more effective. This is due apparently to the formation of flotation bubbles by gas dissolution and which are invisible due to their extremely minute size, as well as to the formation of the larger bubbles which effectively sweep the agglomerated oil to the surface as described above. Such flotation bubbles have not been found to be obtainable by other means.

The following data are given as specific examples of the operation of the present invention by way of illustration and comparison with the conventional stratification procedure for separating oil and water.

*Example 1*

As a comparison of the conventional means of separating oil and water mixtures, the following operation is one in which oil field brine and crude petroleum are separated in a wash tank. A total of 3,000 barrels per day (42 U. S. gallons per barrel) of a mixture of crude petroleum and water is produced from one part of the Playa del Rey field in Southern California. The crude petroleum has a water cut of 90%, that is, it contained 90% by volume of water. This material is passed through a gas trap from which 30 MSCF/D. (1 MSCF/D.=1,000 standard cubic feet per day) of natural gas is removed and the oil and water then passed into a wash tank 15 feet in diameter and 24 feet high. A residence time of about 6 hours in the wash tank is provided. The oil is removed from the top of the tank at a rate of about 325 barrels per day and contains between about 10% and 12% water. The separated water is removed from the bottom of the tank at a rate of 2,675 barrels per day and contains about 300 p. p. m. of emulsified oil and about 5,000 p. p. m. of entrained free oil. The oil stream removed from the wash tank is passed into a plurality of stock tanks each 16 feet high and 20 feet in diameter where it is allowed to stand for prolonged periods and a separation of part of the water is effected. The oil product is removed at a rate of 295 barrels per day containing about 3% water. The contaminated water produced from the wash tank is treated in skim ponds exposed to the atmosphere for the recovery of free oil. However, the 300 p. p. m. of emulsified oil will not settle out even on prolonged standing. This degree of oil contamination is greatly in excess of the maximum amount permitted by local sewage regulations for the disposal of waste water.

*Example 2*

In one modification of the present invention, the treating column is 3.0 feet in diameter and 20 feet high. The 3,000 barrels per day of 90 per cent cut crude oil as produced from the field is passed into the treating column and the oil body maintained in the washing zone therein is countercurrently contacted by 250 barrels per day of recirculated oil-free water heated to a temperature of 200° F. The residence time for the oil in the treating column is about 10 minutes. The water fraction is treated in the bottom of the treating column with 1,500 S. C. F./D. of natural gas as the flotation agent injected at 60 p. s. i. g. into clean water recycle removed from the bottom of the column at a rate of 500 barrels per day and flowing at 45 p. s. i. g. The products from this operation include about 370 barrels per day of dehydrated oil containing less than 20 per cent water and about 2,630 barrels per day of water containing about 30 p. p. m. of oil. The treated water removed from the bottom of the treating column is recirculated in part as the water recycle into the bottom of the treating column with flotation gas. It is seen that a rapid dehydration is effected.

*Example 3*

The operation of Example 2 is effected in conjunction with the supplementary flotation step in which the oil-contaminated water including the wash water is passed into a separate flotation cell providing a water residence time of about 6 minutes. The flotation gas is natural gas introduced at a rate of 1,700 S. C. F./D. and is injected into the recycle water stream flowing at 500 barrels per day and at a pressure of 30 p. s. i. g. A small product oil stream is produced which is combined with the liquid feed to the treating column and the net water production contains 9 p. p. m. of oil. A portion of this water is recirculated at a rate of 500 barrels per day to the countercurrent hot water wash step referred to above.

*Example 4*

The following is an illustration of the present invention shown in Figure 1. The 3,000 barrels per day of del Rey crude petroleum having a 90% cut is passed through a gas trap from which 30 MSCF/D. natural gas are removed. The liquid phase removed from the gas trap is combined with recycled wet oil from the flotation unit and is introduced into the primary treating column which is 3 feet in diameter and 20 feet high. In the upper portion of the column the oil is countercurrently contacted by 150 barrels per day of 180° F. recycle wash water. In the bottom of the column 150 barrels per day of recycle clean water are injected at 45 p. s. i. g. into which 850 S. C. F./D. of natural gas as the flotation gas is injected at 60 p. s. i. g. Partially purified oil having a 40% cut is removed from the top of the primary treating column at a rate of 500 barrels per day and flows through a degassing zone 12 inches in diameter and 12 feet high, packed in the upper portion with 6 feet of Raschig rings. The oil is contacted concurrently with 180 barrels per day of 200° F. water recycle. Gas is broken from the oil and removed and the degassed oil flows to an intermediate point in the secondary treating column. The secondary treating column is 4 feet in diameter and 20 feet high. The oil is countercurrently contacted with 200 barrels per day of 180° F. recycle clean water. The oil product removed from the top of the secondary treating column flows at 308 barrels per day and has a 2½% cut.

The impure water removed from the bottom of the primary and secondary treating columns is combined to form a stream flowing at 3,194 barrels per day and containing 225 p. p. m. of oil. This contaminated water is introduced to the flotation system wherein it is subjected to countercurrent gas flotation. In the flotation system 700 barrels per day of water recycle is employed at 40 p. s. i. g. into which 1,500 S. C. F./D. of natural gas for flotation is injected at 55 p. s. i. g. An oil stream amounting to 2 barrels per day and having a 34% water cut is removed from the flotation system and introduced into the primary treating column. Clean water is removed from the flotation system at a rate of 3,892 barrels per day of which 500 barrels per day is recycled to the countercurrent washing and the flotation operation in the primary and secondary treating columns and 700 barrels per day is used in flotation. The net water production is 2,692 barrels per day and contains 8 p. p. m. of oil.

*Example 5*

An apparatus, having dimensions similar to those described in Example 2, is employed in the treatment of refinery drainage consisting of mixed petroleum hydrocarbon fractions and water. This material is treated at a rate of 1,800 barrels per day. It is countercurrently contacted with recycle water 200° F. and at a rate of 250 barrels per day. The partially dried oil is subsequently treated in a secondary treating or washing column, 20 feet high and 4 feet in diameter, with an additional wash water at the same temperature and at a rate of 250 barrels per day. The substantially dry oil produced contains less than 2½ per cent water. In the bottom of the primary treating column a clean water recycle flowing at the rate of 150 barrels per day and at 45 p. s. i. g. is employed. Into this recycle 1,200 S. C. F./D. of refinery fuel gas for flotation is injected at a pressure of 60 p. s. i. g. The purified water product contains 11 p. p. m. of hydrocarbons.

This process is also effective when used to treat crude petroleum wet with oil field brine.

*Example 6*

The same equipment as described in Example 5 is employed in the dehydration of 1,300 barrels per day of aromatic coal tar hydrocarbons and water in which a clean water recycle rate of 120 barrels per day is employed at 45 p. s. i. g. into which air as the flotation gas is injected at a pressure of 60 p. s. i. g. The oil phase is countercurrently contacted in the primary treating column with 150 barrels per day of clean water recycle heated to 200° F. The oil product contains 6 per cent water and following the secondary hot water washing this water content is reduced to 2.25 per cent.

The operations illustrated in Examples 5 and 6 are particularly desirable in effecting a substantially complete dehydration of wet oils under conditions wherein substantially no vaporization losses can occur, thus preventing atmospheric pollution and consequential losses of valuable volatile products.

*Example 7*

The dehydration of fish liver oil-water mixture containing about 27 per cent oil and flowing at a rate of 1,250 barrels per day is effected in the apparatus referred to in Example 2. The flotation gas employed is nitrogen injected into a clean water recycle. The warm wash water stream flows at 150 barrels per day and is heated to a temperature of 150° F. The unoxidized fish oil is recovered containing only 3.50 per cent water. The clean water product contains only 6 p. p. m. of fish oil.

*Example 8*

A mixed stream of cotton seed oil and water flowing at a rate of 1,310 barrels per day is treated in the primary wash and flotation column of this invention by 750 S. C. F./D. of cooled filtered flue gas as the flotation agent injected at 75 p. s. i. g. into clean water recycle and washed by 210 barrels per day of warm water at a temperature of 200° F. The dehydrated cotton seed oil product contains 2.7 per cent water and the product water following a supplemental flotation treatment contains 10 p. p. m. of cotton seed oil contamination. Substantially no oxidation of the cotton seed oil occurs.

*Example 9*

In the apparatus described and illustrated above, the jet injection and dispersion device as shown in Figure 2 was employed in all cases. The Venturi 390 is of standard design having a 1.25 inch I. D. throat and 3.0 inch I. D. entrance and outlets. The distributor 386 is 3 inches I. D. and 24 inches long and provided with openings 396 of graduated width 0.25 to 1.0 inch. The jet is 0.50 inch I. D. and has a 0.1875 inch I. D. outlet opening.

A considerable variation in the operating conditions of the flotation system of this invention may be made because of the wide variation in the nature of various oil contaminated waters to be treated. The different oils illustrated are successfully treated in any of the modifications of apparatus described and illustrated.

The flotation gas employed is preferably an inexpensive readily obtained gas, but in those instances where highly valuable oils are to be recovered, such as vitamin A containing oils, the so-called essential oils, etc., purified nonoxidizing gases are preferred such as, for example, carbon dioxide, nitrogen, methane, and the like. In many operations air is suitable as a flotation gas. Cooled flue gas may be used in many cases and in the petroleum or coal tar hydrocarbon refining operations such as those described in Examples 2-8 refinery gas, coal or coke gas or natural gas is preferred.

The quantity of flotation gas necessary varies as a function of the degree of oil contamination and also with the nature of the oil-water mixture. Generally, however, between 0.05 and 5.0 S. C. F./barrel is employed. Preferably between 0.1 and 1.0 S. C. F./barrel is used. Lower rates may be employed where the contamination is desirably reduced to a minimum for disposal. Maximum rates are used where economic conditions render desirable a total recovery of oil contamination.

The amount of heated wash water employed in the washing zones and in the degassing zone may be between 0.5 and 10 barrels per barrel of oil and generally between about 1 and 5 barrels per barrel is adequate.

The clean water recycle rate varies somewhat with the solubility therein of the flotation gas and also with the pressure under which this gas is brought into contact with the recycle water. Generally, the recycle rate is between 5 and 35 per cent of the raw water feed rate. Usually between 10 per cent and 20 per cent recycle is sufficient.

The recycle water pressure is variable with the quantity of flotation gas which is desirable to be dissolved in the recycle water for subsequent release in the flotation system. Generally, a pressure of between about 10 and 100 p. s. i. g. above the flotation system pressure is desirable.

The flotation gas injection pressure, e. g., the pressure under which a flotation gas is mixed with the recycle water, is preferably between about 15 and 150 p. s. i. g. above the flotation system pressure to obtain various gas injection rates. This pressure in turn determines together with the recycle rate the quantity of flotation gas available for release in the flotation system.

The flotation system pressure is preferably near atmospheric. However, this pressure may be maintained at subatmospheric or in super-atmospheric values as high as 1,000 p. s. i. g. Preferably pressures between about atmospheric and 100 p. s. i. g. are employed.

The residence time in the flotation system varies with the nature of the oil contamination and with the number of cells. Generally, a residence time of from 1.0 to 60 minutes is adequate for nearly all oil contaminated waters. In most instances residence times of between about 3 and 15 minutes are fully adequate to effect a substantially complete recovery of oil contamination.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the dehydration of water-containing oils which comprises establishing a treating zone containing a flotation zone communicating with a superimposed oil washing zone, introducing oil contaminated with water into said treating zone, maintaining a body of oil in said washing zone, maintaining a body of water in said flotation zone, injecting a stream of clean water recycle containing dissolved flotation gas into said flotation zone, depressuring said recycle stream to liberate flotation gas therefrom whereby emulsified oil particles are agglomerated and carried by the flotation bubbles countercurrently to water passing through said flotation zone and then into said oil washing zone, removing water from said flotation zone, passing a heated stream of clean water recycle in countercurrent contact with said body of oil through said washing zone and on into said flotation zone forming an oil phase of reduced water content, flowing said water removed from said flotation zone into a supplemental flotation zone, injecting additional clean water recycle containing dissolved flotation gas and depressuring said recycle into said supplemental flotation zone to remove residual oil contamination from the water therein, returning recovered oil from said supplemental flotation zone to said treating zone for dehydration, removing clean water from said supplemental flotation zone, employing part thereof as said clean water recycle streams, flowing said oil from said washing zone through a degassing zone, concurrently contacting the oil therein with a stream of hot water, removing liberated gas from said degassing zone, flowing degassed oil and said water into a secondary treating zone, countercurrently contacting said degassed oil with additional hot water to form a dehydrated oil product, and flowing water from said secondary treating zone into said supplemental flotation zone.

2. A process for the dehydration of water-contaminated oil which comprises introducing said oil into a primary treating zone having a primary washing zone and a primary flotation zone communicating therewith, countercurrently contacting the oil phase in said primary washing zone with a countercurrent stream of hot water, depressuring a clean water recycle containing entrained and dissolved flotation gas into the water phase in said primary flotation zone forming a partially purified water, flowing partially dehydrated oil from said primary washing zone into a degassing zone, concurrently contacting said oil therein with another stream of hot water, removing liberated gas from said degassing zone, flowing degassed oil and water into a secondary washing zone, countercurrently contacting the degassed oil with a third stream of hot water forming a warm dehydrated oil product, removing said product from said secondary washing zone, combining said partially purified water with water removed from said secondary washing zone, flowing the combined stream into a supplemental flotation zone, depressuring a clean water recycle containing entrained and dissolved flotation gas thereinto to separate residual oil from said water, recirculating the recovered oil to said primary treating zone, removing clean water as a product from said water, recirculating the recovered oil to said flotation gas under pressure into a stream of clean water removed from said supplemental flotation zone to form said clean water recycle containing entrained and dissolved flotation gas.

3. A process according to claim 2 wherein said water-contaminated oil comprises crude petroleum containing oil field brine.

4. A process according to claim 3 wherein said flotation gas comprises natural gas.

5. A process according to claim 2 wherein said water-contaminated oil comprises a mixture of oil refinery drainage and waste water.

6. An apparatus for the dehydration of water-contaminated oils which comprises a primary treating column, a degassing column, a secondary treating column, and a supplemental flotation chamber, an inlet conduit for water-contaminated oil opening into an intermediate point in said primary treating column, an outlet for gas at the top thereof, a jet flotation and gas dispersion device adapted to mix a flotation gas and recycle water under pressure and to depressure the gas-laden recycle water thus formed into the bottom of said primary treating column, an outlet from the bottom thereof for partially purified water communicating with said supplemental flotation chamber, a conduit for partially dried oil communicating the top of said primary treating column with the top of said degassing column, an outlet conduit for gas opening from the top thereof, an outlet for water and oil from the bottom thereof opening at an intermediate point into said secondary treating column, an outlet for dehydrated oil product from near the top of said secondary treating column, an outlet for water from the bottom of said secondary treating column communicating with said supplemental flotation chamber, an oil recycle conduit communicating the top of said supplemental flotation chamber with said primary treating column, outlet conduit for clean water from said supplemental flotation chamber, a jet dispersion device adapted to mix a recycle stream of said clean water from said supplemental flotation chamber with a flotation gas under pressure and to depressure the resultant gas-laden water recycle into the lower part of said supplemental flotation chamber, means for flowing a stream of clean water from said supplemental flotation chamber, means for heating this stream of water and separate means for injecting heated water into the tops of said primary treating column, said degassing column, and said secondary treating column.

7. An apparatus according to claim 6 in combination with means for collecting gas removed from the top of at least one of said primary treating column, said degassing column, and said supplemental flotation chamber and recirculating said gas as said flotation gas.

8. A process for the dehydration of water-contaminated oil which comprises the steps of introducing water-containing oil into a primary treating zone containing an oil washing zone and flotation zone communicating therewith, maintaining a body of oil in said washing zone, maintaining a body of water in said flotation zone, injecting and depressuring a stream of flotation gas-laden clean water recycle into the bottom of said flotation zone to liberate oil contamination from the water passing therethrugh forming a partially purified water, countercurrently contacting said oil in said washing zone with a stream of heated clean water recycle forming an oil stream of reduced water content, subsequently contacting said oil stream with an additional countercurrent flow of heated clean water recycle in a secondary treating column forming a warm oil product of low water content and an oil-contaminated wash water, removing said oil product from said secondary treating zone, flowing said partially purified water and said contaminated wash water into a supplemental flotation zone, injecting a flotation gas-laden clean water recycle into said supplemental flotation zone forming clean water and wet recovered oil, recirculating the wet recovered oil to said primary treating column, withdrawing a portion of said clean water from said supplemental flotation zone, indirectly heating said water to form said heated clean water recycle streams employed in said primary and secondary treating zones, withdrawing an additional portion of clean water from said supplemental flotation zone, dissolving a flotation gas under pressure therein to form said flotation gas-laden recycle water for injection into said primary flotation zone and said supplemental flotation zone, and removing the remaining part of said clean water therefrom as a product.

9. A process according to claim 8 wherein said countercurrent flow of heated clean water recycle is employed in an amount equal to from 0.5 to 10 barrels of water per barrel of wet oil and wherein said wash water is heated to a temperature between about 100° F. and 200° F.

10. A process according to claim 8 wherein said clean water recycle employed in said primary flotation zone and said secondary flotation zone is injected at a rate of between about 5% and 35% of the flow of water thereinto.

11. A process according to claim 8 wherein said flotation gas is injected into said clean water recycle in an amount equal to between about 0.05 and 5.0 SCF/barrel of water entering each of said flotation zones.

12. An apparatus for the dehydration of water-contaminated oils which comprises a primary treating column, a secondary treating column, and a supplemental flotation chamber, an inlet conduit for water-contaminated oil at an intermediate point in said primary treating column, an outlet for gas at the top thereof, a jet flotation gas dispersion device adapted to mix a flotation gas and recycle water under pressure and depressure the gas-laden recycle water thus formed into the bottom of said primary treating column, an outlet from the bottom thereof for partially purified water communicating with said supplemental flotation chamber, a conduit for partially dried oil communicating the top of said primary treating column with an intermediate point in said secondary treating column, an outlet for dehydrated oil product from the top of said secondary treating column, an outlet for water from the bottom of said secondary treating column communicating with said supplemental flotation chamber, a wet oil recycle conduit communicating the top of said supplemental flotation chamber with said primary treating column, an outlet conduit for clean water from said supplemental flotation chamber, a jet dispersion device adapted to mix a recycle stream of said clean water from said supplemental flotation chamber with a flotation gas under pressure and adapted to depressure the resultant gas-laden water recycle into the lower part of said supplemental flotation chamber, means for flowing a stream of clean water from said supplemental flotation chamber, means for heating this stream of water, and means for injecting a stream of heated water into the tops of said primary treating column and said secondary treating column to pass countercurrent to the bodies of oil maintained therein.

13. An apparatus according to claim 12 wherein said jet injection and dispersion device comprises an elongated tubular member provided with a water-flotation gas mixing chamber at one end, an inspiration chamber adjacent thereto, a slotted flotation gas distributor chamber at the other end of said tubular member, a venturi disposed between said inspiration chamber and said distributor chamber, inlet conduits for recycle water and flotation gas opening into said mixing chamber, said mixing chamber being provided with an opening of restricted cross-sectional area which is coaxially aligned with said venturi, said inspiration chamber being provided with lateral openings, said device being thus adapted to mix water and flotation gas under presusre in said mixing chamber and to discharge the fluid thus formed into and through said inspiration chamber and said venturi whereby said fluid is depressured and discharges liberated flotation gas bubbles from said distribution chamber through the slotted portions thereof.

14. A process for the dehydration of water-contaminated oil which comprises injecting a mixture of water and oil into a treating zone, maintaining a body of oil in an oil washing zone in the upper portion of said treating zone, maintaining a body of water in a flotation zone in the lower portion of said treating zone, withdrawing water of reduced oil content from said flotation zone, dissolving a flotation gas under pressure in said water, depressuring the flotation gas-containing water into said flotation zone thereby liberating said flotation gas therein to pass countercurrently to the flow of said body of water through said flotation zone and removing oil contamination therefrom and carrying the recovered oil into said oil washing zone, countercurrently contacting said body of oil in said washing zone with a heated recycle stream of said water forming an oil product of reduced water content, and removing flotation gas from said oil washing zone.

15. A process according to claim 14 wherein said flotation gas-containing water contains between about 0.05 and 5.0 SCF of flotation gas per barrel of water introduced with said oil into said treating zone and wherein said charged water is recirculated at a rate of between about 5% and 35% of the rate at which water flows into said flotation zone.

16. An apparatus for the dehydration of water-contaminated oil which comprises a vertical treating column, an inlet conduit thereto at an intermediate point for water-contaminated oil, an outlet conduit for gas from the top thereof, an outlet conduit for clean water from the bottom thereof, means for entraining and dissolving a flotation gas under pressure in a portion of said clean water forming a gas-laden clean water recycle, means for depressuring said gas-laden water recycle into said treating column at the bottom thereof, means for heating another portion of said clean water, an inlet conduit for the thus heated water opening into the top of said treating column, an outlet conduit for warm oil production of reduced water content opening from a point adjacent said inlet conduit for hot wash water, and means for maintaining an oil-water interface within said treating column.

17. An apparatus according to claim 16 wherein said means for depressuring said gas-laden water recycle comprises an elongated tubular structure provided with an intermediate venturi, a slotted distributor portion on the down-stream side of said venturi, an inlet for said gas-laden clean water recycle on the up-stream side of said venturi, said inlet opening through a nozzle aligned coaxially with said venturi and an inspiration chamber surrounding said nozzle up-stream from said venturi, said inspiration chamber being provided with lateral openings for the inspiration of fluids thereinto whereby said fluids are mixed with said water recycle and passed through said venturi and slotted distributor portion.

References Cited in the file of this patent

UNITED STATES PATENTS

| | | |
|---|---|---|
| 466,310 | Ritter | Dec. 29, 1891 |
| 1,235,083 | Wagner | May 7, 1913 |
| 1,703,041 | Imhoff | Feb. 19, 1929 |
| 1,960,914 | McCoy | May 29, 1934 |
| 1,968,698 | Meyer | July 31, 1934 |
| 2,106,583 | Webb | Jan. 25, 1938 |
| 2,330,589 | Juell | Sept. 28, 1943 |
| 2,598,988 | Glasgow | June 3, 1952 |